Nov. 1, 1927.
J. G. VINCENT
HYDROCARBON MOTOR
Filed Feb. 10, 1919
1,647,846
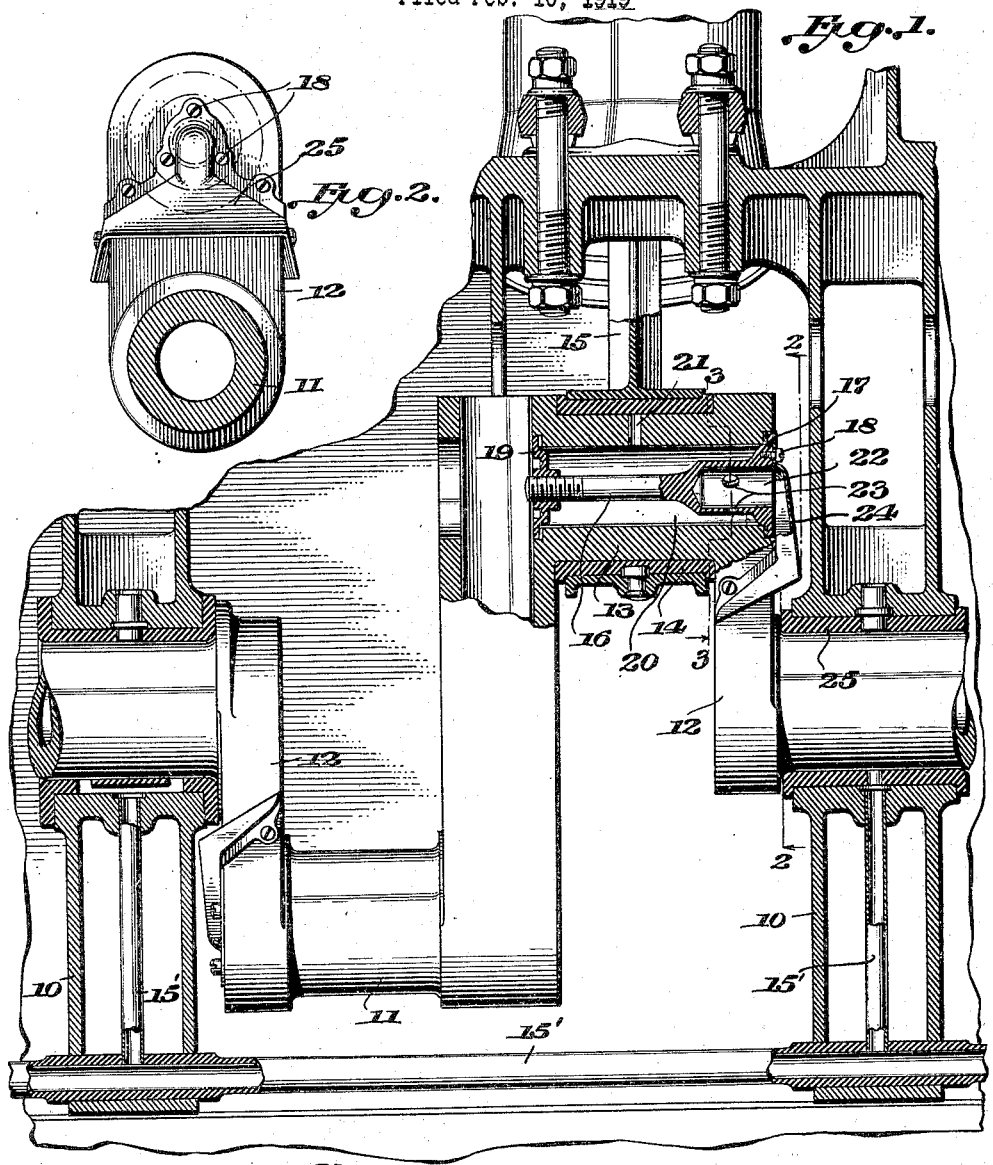
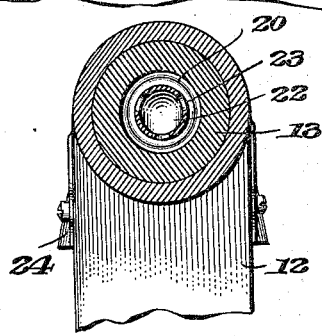
Inventor,
Jesse G. Vincent,
By Milton Sibbetts, Atty.

Patented Nov. 1, 1927.

1,647,846

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed February 10, 1919. Serial No. 275,930.

This invention relates to hydrocarbon motors and more particularly to lubricating systems therefor.

One object of the invention is to provide means whereby a sufficient supply of oil to the bearings of the crank shaft is insured when the motor is being started and to enable such result to be accomplished even under the conditions existing during low atmospheric temperatures.

Another object of the invention is to provide effective means which will not only save the lubricant and direct it to the parts to which it is intended to be applied, but which will also prevent the deflection of an excessive supply of oil into the cylinders.

Another object of the invention is to improve the scupper feed system of oiling the crank shaft bearings.

With these objects and others in view, which will appear from the following specification, the invention is embodied in preferable form in the construction and arrangement hereinafter described and illustrated in the accompanying drawings, in which Fig. 1 is a central vertical section partly in side elevation through a part of a crank shaft and its bearings; and Fig. 2 is a cross section on the line 2—2 of Fig. 1; and Fig. 3 is a section on the line 3—3 of Fig. 1.

Referring to the drawings, 10 designates one of the main bearing supports for the crank shaft, 11 a crank shaft, 12 a crank shaft cheek, 13 a crank pin and 14 bearings intermediate said crank pin and a connecting rod 15 which is adapted to be connected to a piston operating in a cylinder.

The oil is adapted to be fed preferably by pressure, to the conduits 15', and through the same to the bearings surrounding the crank shaft and crank pins.

Referring to the crank pin 13, the same is provided with an opening longitudinally therethrough and projecting through this opening is a bolt 16 provided with a flanged head 17 adapted to be clamped against the crank pin to close the end of the latter. This flanged head closes one end of the hollow space of the crank pin and the other end is adapted to be closed by a plate or plug 19 having a threaded aperture therethrough engaged by the inner threaded end of the bolt 16 and by means of which bolt the plug may be drawn tightly against the surface surrounding the opening so as to effectually close the crank pin and prevent the escape of lubricant therefrom. This arrangement provides a reservoir 20 inside the crank pin which communicates by means of holes 21 with the bearings 14 for the connecting rod. The outer part of the bolt 16 is hollow, providing a chamber 22 in which are formed holes 23 establishing communication with the reservoir 20. The outer end of the chamber 22 is open and communicates with a scupper member 24 fixed on the cheek 12 by screws 18 and projecting angularly therefrom on either side thereof, beyond the crank shaft. This scupper is adapted to catch the oil passing out of the end of the main bearing 25 to the cheek and which is carried by the centrifugal action of the latter toward the outer portion of the crank case. The oil thus caught and diverted is fed into the chamber 22 of the hollow bolt from whence it passes into the reservoir 20 within the crank pin where a part of the oil is retained when the engine stops, no matter what position the pin may then occupy, and when the engine is running a sufficient amount will pass through the holes in the pin to the connecting rod bearings to properly lubricate the latter. With such an arrangement, after the engine has been standing still for a time, even in cold weather, there will be sufficient oil retained in the reservoir members to lubricate the bearings and this reserve body will be fed thereto immediately upon the starting of the motor, thus avoiding danger of the bearings being burned out before oil reaches them from the main supply. The scuppers not only serve to feed the oil passing from the main bearings but also prevent the oil from being thrown into the cylinders from the revolving cheeks. This result enables cylinder oiling in definite quantities to be obtained from the connecting rod bearings.

Having thus described my invention, what I claim and desire to secure by Letters Patent is:—

1. A crankshaft having a crank pin formed with a reservoir to supply oil to the crank pin bearing, means for feeding oil to said reservoir, and means on the crankshaft for retaining part of the oil in the reservoir regardless of the position in which the crankshaft stops.

2. A crankshaft including a hollow part having an annular wall surrounded by a bearing and communicating through said wall with said bearing and having a centrifugal throw feed from said part to the bearing, said part having an opening communicating with a source of lubricant and offset from said annular wall whereby a quantity of the lubricant will be retained in said part when the motor stops.

3. A crankshaft having a main bearing part, a crankpin part and a cheek connecting said parts, said crankpin part having a reservoir communicating with its bearing to feed oil thereto, a scupper on the cheek for catching oil from the main bearing part and delivering it to the reservoir, and means to retain a quantity of oil in the reservoir regardless of the position in which the crankshaft stops.

4. A hollow crank pin having openings connecting the interior thereof with a source of lubricant and with a bearing, the opening to the source of lubricant being offset from the bearing wall, and means closing the ends of said pin against the escape of lubricant.

5. A hollow crank shaft pin having a plug closing one end thereof, an oil inlet opening offset from the wall of the pin, a screw bolt having one end engaging said plug and having a head at the opposite end, and means to secure said head on the crank pin.

6. A hollow crank shaft pin having means closing one end thereof, a hollow bolt in said pin engaging said closing means and means of communication between the interior of said bolt and the interior of said pin.

7. In combination with a crank shaft having an oil conveying channel, a hollow crank pin having an oil inlet through one end thereof, an oil retaining reservoir therein, a crank cheek, and scupper means on said cheek to convey oil from said channel to said oil inlet.

8. In combination with a crank shaft having an oil conveying channel, a hollow crank pin having an oil inlet through one end spaced from the inner surface of said hollow pin, means closing the ends of said pin to form a reservoir therein, a crank cheek, scupper means on said cheek to convey oil from said channel to the oil inlet, and means to lead the oil from said inlet to the reservoir.

9. In combination with a crank shaft having a hollow crank pin and means forming an oil reservoir within said pin, a cheek, a scupper on said cheek, and an open hollow perforate member within said pin to receive the oil from the scupper.

10. In combination with a crank shaft having a hollow crank pin and means forming a reservoir in said pin, a scupper, and a hollow perforated member in said pin communicating with the scupper.

11. In combination with a hollow crank shaft having a hollow crank pin, means closing an end of said pin, a hollow bolt in said pin securing said means, and a scupper leading to the interior of the bolt, the interior of said bolt communicating with the interior of the crank pin.

12. In combination with a crank shaft, a hollow crank pin, a hollow bolt in said pin having an open head at one end thereof secured to and closing one end of said pin and communicating with the hollow space therein, a scupper extending over said open head of the bolt to lead oil to the interior of the latter, a plug closing the other end of the pin and threaded to said bolt.

In testimony whereof I affix my signature.

JESSE G. VINCENT.